United States Patent Office 3,203,956
Patented Aug. 31, 1965

3,203,956
FLUORESCING DYES OF THE PYRIDINO ANTHRONE SERIES
John W. Orelup, Short Hills, N.J.
No Drawing. Filed May 31, 1963, Ser. No. 284,339
18 Claims. (Cl. 260—272)

This is a continuation-in-part of a co-pending application Serial No. 856,934, filed December 3, 1959, now abandoned.

This invention relates to certain fluorescent 2-alkylamino-alkyl 1-9 pyridino anthrone dyes, intermediates that are useful in preparing these dyes and to the process for producing the dyes and the intermediates. More particularly, the alkyl pyridino anthrone fluorescent dyes of the present invention may be described by the general formula (1)

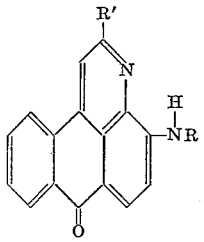

wherein R' is alkyl and R is selected from the class consisting of alkyl having at least two carbon atoms and cycloalkyl, hydroxyalkyl.

The dyes of this invention are useful in petroleum applications to mark brands or differentiate products, in lubricating oils and greases, waxes, polystyrene, polyethylene and other plastics. They are also useful in dyeing synthetic fibers producing bright greenish yellow hues on acetate silk or nylon. The very powerful daylight fluorescence of the 2-alkyl amino compounds of this invention in petroleum and other organic solvents makes them useful in the plastic, lacquer, coatings industry. These new compounds also fluoresce brilliantly greenish yellow under ultra violet light.

In many of the industrial arts a need exists for powerful yellow dyes which are soluble in polar and non-polar hydrocarbon solvents. It has now been found that the introduction of the group

wherein R is an alkyl of at least two carbon atoms into the 2 position of an alkyl substituted 1-9 pyridino anthrone as shown in Formula 1 above produces powerful fluorescent yellow dyes.

A study of the effect of the particular group or its location in the structure of the alkyl pyridino anthrone nucleus on the fluorescence of the dye has shown that both are highly important in determining the fluorescence of the dye. Thus, for example, the unsubstituted alkyl 1-9 pyridino anthrone itself or the 2-chlorinated, 2-brominated or 2-sulphonated compound is colorless. Furthermore, the 2-amino methyl pyridino anthrone carefully prepared and recrystallized has less than 50% the fluorescent strength of the 2-alkyl amino compounds of the present invention and, incidentally, is very much less soluble in organic solvents (five milligrams are soluble in 100 ml. of kerosene). Moreover, the corresponding aryl amino compounds do not fluoresce.

Aside from the fact that the group present on the 1-9 pyridino anthrone nucleus and its position markedly influence the fluorescence of the compound, it has further been found that presence of one group will very materially affect the influence of another group as to these properties. Thus, the 2-hexylamino 4-brom-1,9 methyl pyridino anthrone produced from the 2,4-dibromo-1,9 methyl pyridino anthrone is a darker green fluorescent in organic solvents but has only 39% of the fluorescent strength compared to the corresponding 2-hexyl amino compound without bromine in the 4 position. (Melting point 124.5° greenish yellow plates.)

It has further been found that material differences in the fluorescence of compounds also exist between isomeric alkylamino alkyl pyridino anthrones. Thus 4-hexylamino-1,9-methyl pyridino anthrone prepared from 4-brom-1,9-methyl pyridino anthrone and crystallized in long needle form from the reaction mixture is very much more soluble in organic solvents than the corresponding 2-hexyl-amino compound. The fluorescent shade is of a darker blue green but of only 15% fluorescent strength compared to the 2-hexylamino compound. In concentrated sulphuric acid the color is a clear yellow instead of the brilliant cherry red of the 2-alkylamino products. The advantage of strength and brilliance of the 2-alkyl amino over the 4 substituted products is clear.

In summary the alkyl pyridino anthrone compounds defined above in Formula 1 for a distinct group of compounds having excellent fluorescent properties which are not exhibited even by closely related compounds and which was unexpected on the basis of the prior art.

It is accordingly an object of the present invention to provide a highly fluorescent 1-9 pyridino anthrone dye.

It is a further object of the present invention to provide intermediates which are useful in the preparation of said dyes.

It is still a further object of this invention to provide processes for preparing said dyes and intermediates.

Other and more detailed objects will be made apparent from the following description.

As noted above, in accordance with the present invention the substituent R in Formula 1 above may be any alkyl radical. This includes both the higher and lower alkyl radicals. As a practical matter this alkyl radical will rarely exceed 30 carbon atoms and most often will not be greater than 18 carbon atoms. In the preferred form of this invention R' is a lower alkyl radical, e.g., methyl, ethyl, propyl, iso-propyl, butyl, tert-butyl, amyl, hexyl, etc.

R in Formula 1 is generally defined above as an alkyl of at least two carbon atoms, hydroxyalkyl, cycloalkyl or a morpholinoalkyl radical. When R is an alkyl or hydroxyalkyl radical (preferably monohydroxyalkyl), it will rarely exceed 30 carbon atoms and preferably will lie in the range of from 2 to 18 carbon atoms. In this connection it should emphasized that R in Formula 1 excludes methyl as it was found that the methyl amino compound has insufficient solubility for practical purposes and low affinity to synthetic fibers and the like materials to be dyed. When R is cycloalkyl, it will rarely exceed a cycloalkyl radical which has more than 8 carbon atoms in the ring. In the preferred form of this invention, the cycloalkyl radical contains up to 6 carbon atoms in the ring.

The development of color and fluorescent effect is achieved with the amino group —NHR as defined above in 2-position of the anthrone ring. The length of the alkyl carbon changes the solubility in different solvents but not to any extent the hue. All derivatives from the ethyl amino through stearyl amino are of substantially the same greenish yellow hue. The ethyl, propyl and isopropyl amino compounds being more soluble in polar solvents, as alcohols, ethyl acetate, butyl acetate, etc., while the ascending carbon series, i.e., butyl, amyl, hexyl, stearyl, etc. become more soluble in non-polar solvent hydrocarbons as gasoline, kerosene, waxes, lubricating oils, jet fuels. All compounds are soluble and fluorescing in benzenoid solvents.

The intermediates which are useful in the preparation of the dyes shown in Formula 1 above may be described by the general formula (2) 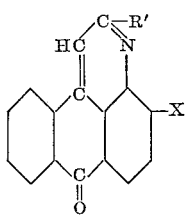

wherein R' has the same values ascribed to it in connection with Formula 1 above and X is —Cl, —Br or —SO₃H radical. These intermediates are conveniently prepared by condensing the 2-chlor, 2-brom or 2-sulpho, 1-amino anthraquinone with a ketone of formula (3) $CH_3—C—R'$
         $\|$
         $O$ in a solvent or water medium with an alkali. In Formula 3 R' has the value ascribed to it above in connection with Formula 1. It will be noted that the ketone must contain a methyl group (dimethyl ketone, ethyl methyl ketone, methyl butyl ketone, etc.)

The ring closure forming the pyridino ring proceeds quantitatively. The reaction can be followed by microscopic examination of a test portion. The yellowish red crystals of 1-amino 2-brom, 1-amino 2-chlor or 1-amino 2-sulpho anthraquinone change to colorless needle crystals of the alkyl pyridino anthrone. The reaction is complete when a test in concentrated sulphuric acid with a few drops of formaldehyde no longer shows the violet color of unchanged 1-amino but is clear yellow. The new pyridino compound is filtered off in a quantitative yield and is of sufficient purity to be used directly for condensation with an amine defined by the formula (4)        $H_2NR$ wherein R has the value ascribed to it in connection with Formula 1.

The 2-brom pyridino anthrone or 2-chlor pyridino is condensed with an excess of amine, conveniently with an acid binding agent as sodium or potassium acetate or carbonate and a small amount of copper catalyst. The sulpho pyridino compound reacts very reluctantly as a sodium or potassium salt and should be converted to the free acid or ammonium salt before or during the condensation. The reaction mass is diluted with alcohol or water and the crystalline yellow 2-alkyl amino alkyl pyridino anthrone filtered off. Yields depending on the alkyl amino compound and conditions are from 70–90% theory.

Examples of the method of formation of the pyridino ring from 1-amino anthraquinones and a description of their properties follow.

*Example 1*

90 gm. 1-amino-2-chlor or 1-amino-2-brom anthraquinone are refluxed while stirring with 225 gm. dimethyl ketone, 45 gm. of aqueous sodium hydroxide (50%) and 1090 ml. water at temperatures of 74–75° C. The initial red brown color of the reaction mass lessens in color becoming finally almost colorless. Microscope examination shows the production of needles of the new 1,9-methyl pyridino-2-chlor (2-brom) anthrone. After about 20–30 hours the reaction is complete when a test in concentrated sulphuric acid and the addition of a few drops of formaldehyde remains yellow, not violet or blue. The pyridino anthrone is insoluble in water and is isolated by filtration and washed with water.

The product is sufficiently pure to be used directly for condensation with alkyl amines. Yield is over 90 gm. If the methyl ethyl ketone is used in place of dimethyl ketone the reaction is slower and requires more time and a higher temperature in a closed vessel.

*Example 2*

The 4-brom-1,9-methyl pyridino anthrone and the 2,4-dibrom-1,9-methyl pyridino anthrone is synthesized in the same way as the 2-brom or 2-chlor. The 2,4-dibrom compound after crystallization from pyridine has a melting point of 235° C. Colorless or light brown stained long red crystals insoluble in water, methanol, benzol glacial acetic, and soluble in hot chlor benzol are obtained. Bromine analysis shows dibromo theory percent.

*Example 3.—Example of the preparation of 2-sulpho-1,9-methyl pyridino anthrone*

400 gm. 100% of 1-amino-2-sulpho anthroquinone as a 20% paste is stirred with 1400 ml. water, 400 gm. dimethyl ketone and 200 gm. of aqueous sodium hydroxide (50%), and heated under reflux to 68–72° C. for ten hours. At this time a test in concentrated sulphuric acid remains yellow and not violet upon the addition of a small amount of formaldehyde. The mass is made acid to Congo red with hydrochloric acid then filtered and washed with water. On drying the yield is 418 gm. of a light chocolate colored crystalline powder.

The crude 2-brom methyl pyridino anthrone is a crystalline powder almost colorless or light clay in color. It recrystallizes from chlor benzol in long blades M.P. 233° C. and gives in concentrated suphuric acid a yellow color. No change with boric acid is noted. It is insoluble in water, hardly soluble in cold glacial acetic, but soluble in hot glacial acetic acid. It is soluble in concentrated hydrochoric acid, but not soluble in hot or cold methanol or isopropanol. It is sparingly soluble in cold benzene, but soluble in hot benzene. It is soluble in hot monochlorbenzol and colorless in acetic anhydride plus boric acid.

2-chlor-1,9-methyl pyridino anthrone crude is a crystalline powder small needles, light clay yellowish colored. It recrystallizes from chlorbenzol M.P. 352° C. as long, flat needles in bundles, colorless to weak yellow tinge. In concentrated sulphuric acid it is yellow. No change is noted on the addition of boric acid. It is insoluble in water, sparingly soluble in cold glacial acetic but soluble in hot glacial acetic acid. It is soluble in cold benzene, soluble in hot benzene, soluble in hot monochlorbenzol, and colorless in acetic anhydride plus boric acid.

The sodium salt of 2-sulpho-1,9-methyl pyridino anthrone is a light reddish brown powder, nearly insoluble in cold water and very sparingly soluble in hot water. The ammonium salt is easily soluble in water and crystallizes in small clumps of needle forms. In concentrated sulphuric acid it gives a yellow color, and on the addition of boric acid a yellow brown fluorescence. The sodium salt is insoluble in methanol or isopropanol and very slightly soluble in hot methanol or isopropanol. It is insoluble in glacial acetic, very slightly soluble in hot gacial acetic acid, and souble in hot pyridine.

The dyes of the present invention may be prepared by condensing the intermediate of Formula 2 above with an amino compound shown in Formula 4 above. This reaction may be illustrated by the following equation:

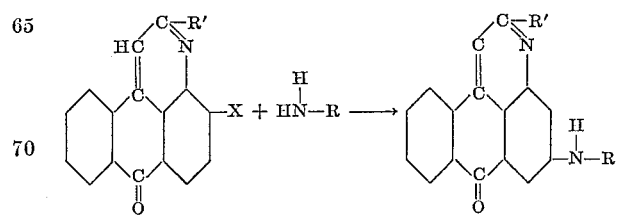

wherein R' and R have the same value ascribed to them above in connection with Formula 1 and X is —Cl, —Br or —SO₃H.

The following examples are particular applications of the process shown generally in Equation 5.

Example 4

100 gm. 2-sulpho-1,9-methyl pyridino anthrone sodium salt, 250 gm. water, 25 gm. conc. HCl are stirred and warmed until the sodium salt is converted to the free acid, then 350 gm. n-hexyl amine is added, refluxed for ten hours at 96–98° C., and cooled to 3° C. at which time excellent orange yellow needles separate. These are filtered and washed with a small amount of methanol. The fluorescent color strength is equal to the recrystallized material. It is clear yellow in organic solvent. The product recrystallizes in two crystal forms of different melting points. When recrystallized from benzene it has a melting point of 117° C. and when recrystallized from isopropanol a melting point of 130° C. These different crystal form types are of equal fluorescent strength and can be converted from one to another.

Example 5

35 gm. 2-brom-1,9-methyl pyridino anthrone are added to melted octa decyl amine and 24 gm. potassium acetate with 1 gm. of copper acetate and stirred and heated ten hours at 110–120° C., then cooled to 70° C. and 500 ml. methyl alcohol are added with 100 ml. glacial acetic acid. The reaction mixture is then allowed to cool to 40–50° C. and filtered and washed with methyl alcohol. The product is a crystalline orange powder. The 2-octa decyl amino-1,9-methyl pyridino anthrone recrystallizes from benzene with a small amount of acetic acid added in long yellow needles of melting point 110° C.

Example 6

100 gm. 2-chlor-1,9-methyl pyridino anthrone are added to a melted mix of 400 gm. dodecyl amine, 70 gm. potassium acetate, 1 gm. copper acetate and stirred and heated 16 hours at 130° C.–140° C. The mass is cooled to 70° C., then 400 ml. methanol and 50 ml. acetic acid are added, then cooled to 20–25° C. and filtered and washed with methanol. When recrystallized from isopropanol it melts at 101° C. as large golden plates.

Example 7

| | Gm. |
|---|---|
| 2-chlor-1,9-methyl pyridino anthrone | 100 |
| Ethyl amine, 70% | 50 |
| Potassium acetate | 70 |
| Copper acetate | 1 |

The above mixture is heated under pressure in an autoclave for 7 hours at 110–120° C., cooled, filtered and washed. It recrystallizes from benzene as yellow short thick rhomboids. Melting point is 200–201° C.

Example 8

| | Gm. |
|---|---|
| 2-brom-1,9-methyl pyridino anthrone | 50 |
| Monoethanolamine | 250 |
| Copper acetate | 0.50 |
| Potassium acetate | 50 |

This mixture is heated while stirring at 123–125° C. for six hours, cooled to 60° C., then diluted with methanol, filtered and washed. It recrystallizes from pyridine as long reddish flat needles with a melting point of 245° C. This 2-ethanol amino compound is interesting not only as a solvent color but also as a dye for acetate silk and nylon. The dyeing is clear brilliant yellow fluorescing in ultra violet light yellow green.

The following table lists the properties of various compounds which have been prepared in accordance with the present invention. The melting points given are the melting points of the purified product. The structures of the various compounds are as follows:

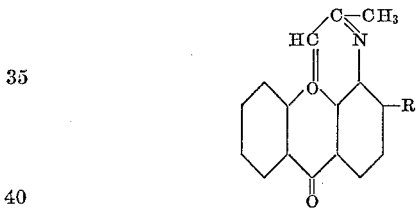

wherein R is the particular group specified in the example. Example 29 is illustrative of an ethylpyridino anthrone encompassed by the present invention.

| Ex. No. | R | Melting point, °C. | Recrystallized from— | Crystal form |
|---|---|---|---|---|
| 9 | Ethyl amino | 200 | Benzene | Yellow short rhomboids. |
| 10 | n-Propyl amino | 200 | Benzene isopropanol. | Long yellow needles. |
| 11 | Isopropyl amino | 242 | Benzol | Long flat yellow needles. |
| 12 | n-Butyl amino | 147 | Methanol | Long flat orange needles. |
| 13 | n-Amyl amino | 165 | Isopropanol | Orange, 4-sided plates. |
| 14 | Mixed amyl amino | 158 / 137 | Pyridin-H₂O | Bronze plates. |
| 15 | n-Hexyl amino | 118 / 130.5 | Benzene isopropanol. | 4-sided plates, fine yellow needles. |
| 16 | Cyclohexyl amino | 171 | Methanol | Long flat yellow orange blades. |
| 17 | n-Octyl amino | 115 | do | Long orange yellow narrow plates. |
| 18 | Ethyl hexyl | 127 | do | Fine yellow orange needles. |
| 19 | n-Decyl amino | 115 | Isopropanol | Bronze plates. |
| 20 | n-Dodecyl amino | 101 | do | Golden plates. |
| 21 | n-Tetradecyl | 96.5 | do | Orange plates. |
| 22 | n-Hexa decyl | 109 | N-butanol | Orange fine needles. |
| 23 | n-Octa decenyl | 67–69 | Isopropanol | Brownish yellow platelets. |
| 24 | n-Octa decyl | 111.5 | Benzol and acetic. | Long yellow needles. |
| 25 | Ethanol amino | 245 | Pyridine | Reddish flat needles. |
| 26 | 2-amino 1-butanol | 207 | Xylol isopropanol. | Orange red rhomboids. |
| 27 | 2-amino propyl morpholine. | 202 | Xylene isopropanol. | Large square plates. |
| 28 | 2-n-hexyl amino-1,9 ethyl pyridino anthrone. | 132 | Isopropanol | Large golden yellow plates. |

While the invention has been described with particular reference to specific embodiments, it is to be understood that it is not limited thereto, but is to be construed broadly and restricted solely by the scope of the appended claims.

What is claimed is:

1. A fluorescent dye of the pyridino anthrone series of the formula

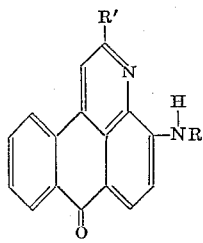

wherein R' is alkyl consisting of up to 30 carbon atoms in the alkyl chain and R is selected from the group consisting of alkyl of from 2 to 30 carbon atoms in the alkyl chain, hydroxyalkyl wherein the alkyl radical consists of up to 30 carbon atoms in the alkyl chain and cycloalkyl consisting of 6 carbon atoms in the ring.

2. A dye according to claim 1, wherein R is cycloalkyl consisting of 6 carbon atoms in the ring and R' is alkyl consisting of up to 18 carbon atoms in the alkyl chain.

3. A dye according to claim 1, wherein R' is lower alkyl and R is a cycloalkyl radical consisting of 6 carbon atoms in the ring.

4. A dye according to claim 1, wherein R is hydroxyalkyl whose alkyl chain consists of up to 18 carbon atoms and R' is alkyl consisting of up to 18 carbon atoms.

5. A dye according to claim 4, wherein R' is lower alkyl and R is a monohydroxyalkyl whose alkyl chain consists of up to 18 carbon atoms in the alkyl chain.

6. A compound having the following formula

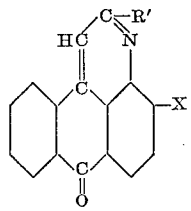

wherein R' is alkyl consisting of up to 30 carbon atoms and X is a radical selected from the class consisting of —Cl, —Br, —SO₃H.

7. A compound according to claim 6, wherein R' is alkyl consisting of up to 18 carbon atoms and X is —Cl.

8. A compound according to claim 6, wherein R' is lower alkyl and X is —Cl.

9. A compound according to claim 6, wherein R' is alkyl consisting of up to 18 carbon atoms and X is —Br.

10. A compound according to claim 6, wherein R' is lower alkyl and X is —Br.

11. A compound according to claim 6, wherein R' is alkyl consisting of up to 18 carbon atoms and X is —SO₃H.

12. A compound according to claim 6, wherein R' is lower alkyl and X is —SO₃H.

13. 2-n butylamino-1,9-methylpyridino anthrone.
14. 2-n hexylamino-1,9-methylpyridino anthrone.
15. 2-cyclohexylamino-1,9-methylpyridino anthrone.
16. 2-aminoethanol-1,9-methylpyridino anthrone.

17. A fluorescent dye of the pyridino anthrone series of the formula

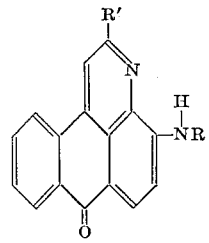

wherein R is alkyl of from 2 to 18 carbon atoms and R' is alkyl of up to 18 carbon atoms.

18. A fluorescent dye of the pyridino anthrone series of the formula

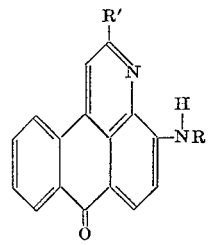

wherein R' is lower alkyl and R is an alkyl radical of from 2 to 18 carbon atoms in the alkyl chain.

References Cited by the Examiner

FOREIGN PATENTS 659,651   5/38   Germany.

NICHOLAS S. RIZZO, *Primary Examiner.*